(12) United States Patent
Muramatsu

(10) Patent No.: US 8,142,080 B2
(45) Date of Patent: Mar. 27, 2012

(54) SEALED ROLLING BEARING

(75) Inventor: Makoto Muramatsu, Iwata (JP)

(73) Assignee: NTN Corporation, Osaka (JP)

( * ) Notice: Subject to any disclaimer, the term of this patent is extended or adjusted under 35 U.S.C. 154(b) by 374 days.

(21) Appl. No.: 12/514,501

(22) PCT Filed: Nov. 12, 2007

(86) PCT No.: PCT/JP2007/071913
§ 371 (c)(1),
(2), (4) Date: May 12, 2009

(87) PCT Pub. No.: WO2008/059790
PCT Pub. Date: May 22, 2008

(65) Prior Publication Data
US 2010/0040316 A1    Feb. 18, 2010

(30) Foreign Application Priority Data

Nov. 14, 2006 (JP) ................................. 2006-307874
Nov. 14, 2006 (JP) ................................. 2006-308165

(51) Int. Cl.
*F16C 33/78*    (2006.01)
(52) U.S. Cl. ......................... 384/482; 384/484; 384/488
(58) Field of Classification Search .................. 384/477, 384/484, 486, 482, 488
See application file for complete search history.

(56) References Cited

U.S. PATENT DOCUMENTS 3,203,704 A * 8/1965 Mureller ..................... 277/384
6,302,403 B1   10/2001 Pairone et al.

FOREIGN PATENT DOCUMENTS

| JP | 8-219150 | 8/1996 |
| JP | 2000-170778 | 6/2000 |
| JP | 2003-148496 | 5/2003 |
| JP | 2005-273885 | 10/2005 |
| JP | 2006-097709 | 4/2006 |

OTHER PUBLICATIONS

International Search Report issued Feb. 12, 2008 in the International (PCT) Application of which the present application is the U.S. National Stage.

* cited by examiner

*Primary Examiner* — William C Joyce
(74) *Attorney, Agent, or Firm* — Wenderoth, Lind & Ponack, L.L.P.

(57) ABSTRACT

A radially outer portion of the seal member is fitted in each of a pair of seal grooves formed in the radially outer surface of an outer ring at both ends thereof. A seal lip formed at the radially inner portion of each seal member is brought into elastic contact with an inner seal surface of each of annular grooves formed in the radially outer surface of an inner ring at both ends thereof. The contact portion of the seal surface that is in elastic contact with the seal lip has a circumferential flatness of 5 to 20 μm. With this arrangement, it is possible to improve sealability at the contact portions, thereby preventing entry of e.g. muddy water into the bearing.

4 Claims, 3 Drawing Sheets

SEALED ROLLING BEARING

BACKGROUND OF THE INVENTION

I. Technical Field

This invention relates to a sealed rolling bearing.

II. Description of the Related Art

Bearings for electromagnetic clutches in car air-conditioners, bearings for pulleys and alternators in cars are exposed, e.g. to rainwater and muddy water, during use. Thus, for these bearings, sealed rolling bearings are used to prevent entry of rainwater and muddy water.

Conventional sealed rolling bearings include one comprising an outer race having an outer raceway formed on its radially inner surface, and seal grooves formed in its radially inner surface on both sides of the outer raceway, an inner race having an inner raceway formed on its radially outer surface, and annular grooves formed in its radially outer surface on both sides of the inner raceway and each having an inner seal surface, rolling elements mounted between the inner and outer raceways, and seal members having their radially outer portions fitted in the respective seal grooves, and each having at its radially inner portion an inwardly extending contact type seal lip kept in elastic contact with the seal surface of the corresponding annular groove, thereby sealing the interior of the bearing.

SUMMARY OF THE INVENTION

In this type of conventional sealed rolling bearings, the seal surface of each annular groove has a circumferential flatness exceeding 25 μm at its portion that is in contact with the seal lip of the seal member. Thus, the interference of the seal lip is uneven in the circumferential direction of the seal surface. Also, when the outer race rotates at high speed, the edge of the seal lip is unable to follow the axial movement of the seal lip, thereby allowing entry of rainwater and muddy water into the bearing.

An object of the present invention is to provide a sealed rolling bearing which has high sealability sufficient to substantially completely prevent entry of muddy water.

In order to achieve this object, the present invention provides a sealed rolling bearing comprising an outer race having an outer raceway formed on its radially inner surface, and seal grooves formed in its radially inner surface on both sides of the outer raceway, an inner race mounted in the outer race, the inner race having an inner raceway formed on its radially outer surface, and annular grooves formed in its radially outer surface on both sides of the inner raceway, the annular grooves each having an inner seal surface, rolling elements mounted between the outer raceway and the inner raceway, and seal members having their radially outer portions fitted in the respective seal grooves, and each having at its radially inner portion an inwardly extending contact type seal lip kept in elastic contact with the seal surface of the corresponding annular groove; characterized in that the seal surface of each of the annular grooves has a circumferential flatness of 5 to 20 μm at its portion that is in contact with the seal lip.

If the flatness of the seal surfaces is less than 5 μm, it is necessary to increase the chucking accuracy of a finishing machine and the rigidity of a cutting tool, which pushes up the manufacturing cost of the bearing. Thus, to reduce the manufacturing cost, the above flatness value is set to not less than 5 μm.

Preferably, in the sealed rolling bearing according to this invention, each of the seal members has on its inner surface a non-contact type seal lip that faces a portion of the radially outer surface of the inner ring between the inner raceway and the corresponding annular groove to define a gap therebetween, the non-contact type seal lip being formed with oil passages through which the interior of the bearing communicates with a sliding contact portion of the corresponding contact type seal member. With this arrangement, it is possible to supply a suitable amount of grease to the sliding portions of the contact type seal lips, and to effectively prevent leakage of grease and maintain sealability.

The oil passages may be in the form of cutouts or through holes extending from the radially inner to outer surface of the non-contact type seal lip. The oil passages are preferably circumferentially spaced from each other so as to uniform supply grease to the sliding portion of the non-contact type seal lip over the entire circumference thereof, thereby reducing torque loss and preventing uneven wear of the non-contact type seal lip.

By setting the circumferential flatness of the seal surface that is in contact with the seal lip to 5 to 20 μm, the interference of the seal lip provided at the radially inner portion of each seal member becomes uniform in the circumferential direction of the seal surface. Also, when the outer race rotates at high speed, the axial movement of the seal surface is minimum, so that the edge of the seal lip can smoothly follow the axial movement of the seal surface. This improves sealability of the sealed rolling bearing to such an extent that the entry of muddy water can be substantially completely prevented.

DETAILED DESCRIPTION OF THE INVENTION

Figure 1:
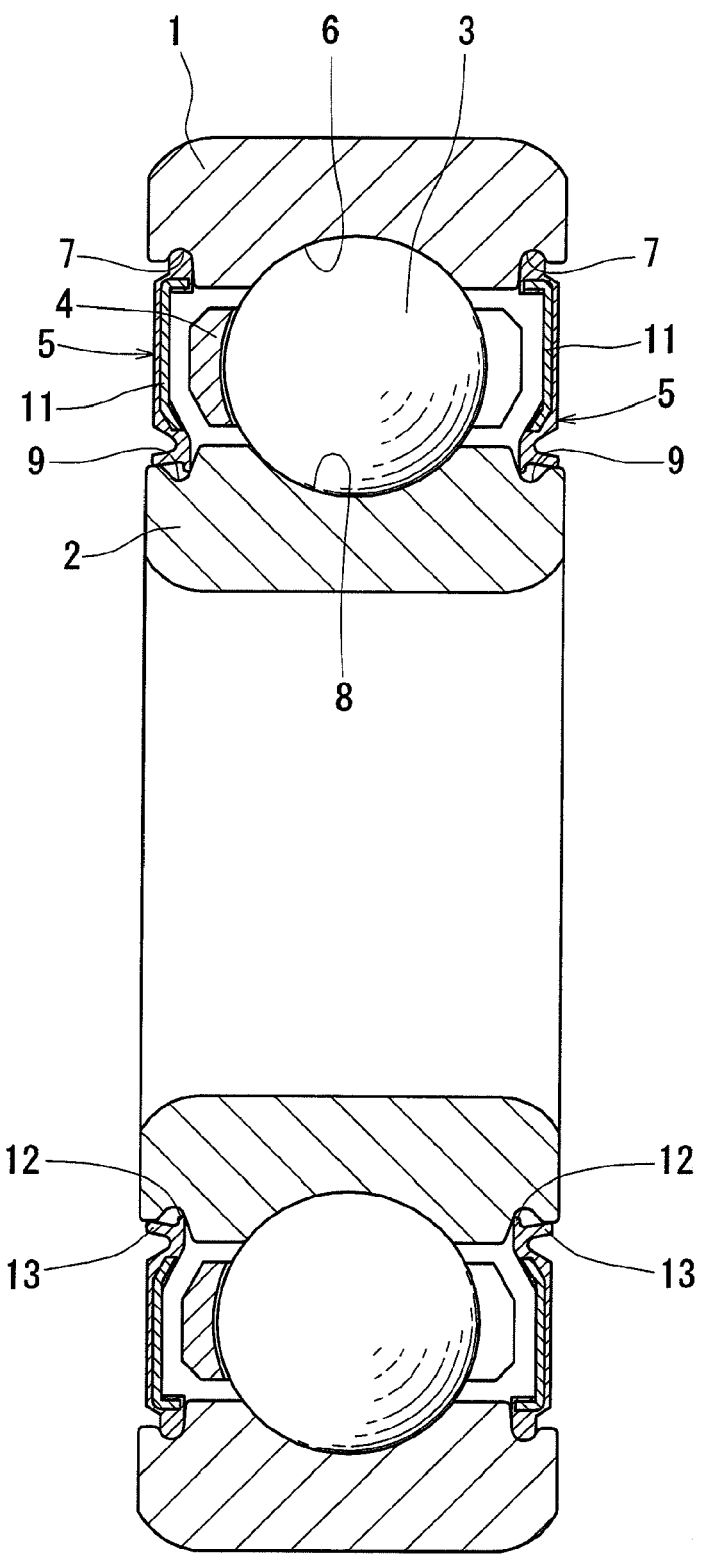
FIG. 1 is a vertical sectional front view of a sealed rolling bearing embodying the present invention.

The embodiments of this invention are now described with reference to the drawings. The sealed roller bearing shown in FIG. 1 comprises an outer race 1, an inner race 2 mounted inside the outer race 1, rolling elements 3 supporting the inner and outer races 2 and 1 so as to be rotatable relative to each other, a retainer 4 supporting the rolling elements 3, and a pair of seal members 5 sealing a bearing space defied between opposed surfaces of the inner and outer races 2 and 1.

The outer race 1 has on its radially inner surface a raceway 6 and a pair of seal grooves 7 on both side of the raceway 6. The inner race 2 has on its radially outer surface a raceway 8 radially opposed to the raceway 6. The rolling elements 3 are disposed between the inner race raceway 8 and the outer race raceway 6.

The inner race 2 is further formed with a pair of annular grooves 9 on its radially outer surface on both sides of the raceway 8. The annular grooves 9 each have an axially inner wall that serves as a seal surface 10.

The seal members 5 have their radially outer portions fitted in the respective seal grooves 7, each reinforced by a seal metal core 1 and having at its radially inner portion an axially inwardly extending contact type seal lip 12 and an axially outwardly extending seal lip 13.

Figure 2:
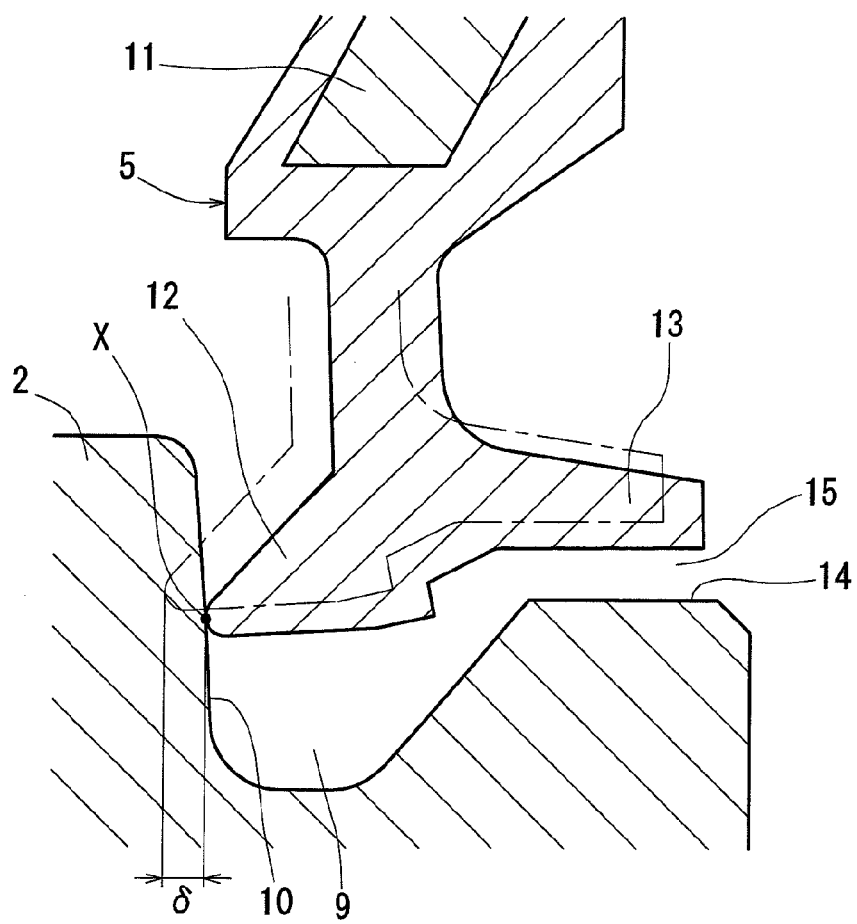
FIG. 2 is an enlarged sectional view of a contact portion of a seal lip of FIG. 1.

As shown in FIG. 2, the axially inwardly extending contact type seal lip 12 is in elastic contact with the seal surface 10 of the annular groove 9. The axially outwardly extending seal lip 13 radially faces one of the lands 14 formed on the radially outer surface of the inner race 2 at both ends thereof, thereby defining a labyrinth 15 between itself and the land 14. The symbol δ in FIG. 2 indicates the interference of the axially inwardly extending contact type seal lip 12.

Figure 3:
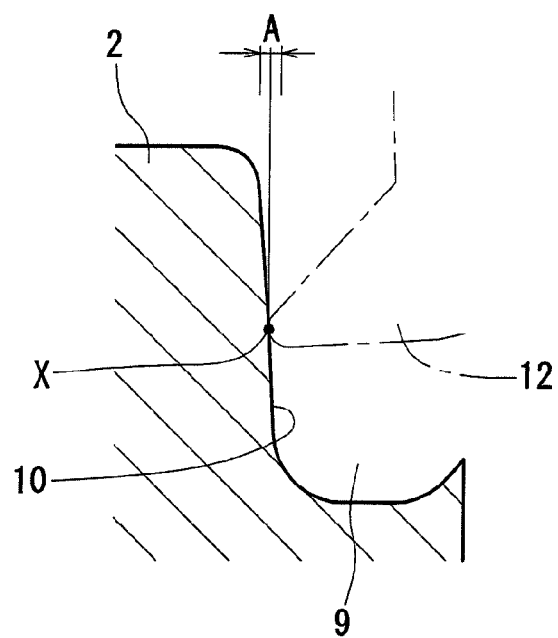
FIG. 3 is a sectional view of a seal surface of FIG. 2.

FIG. 3 shows circumferential flatness A of the contact portion X of the seal surface 10 that is in contact with the contact type seal lip 12. This flatness A has a large influence of the sealing properties of the bearing. If the flatness A is larger than 20 μm, the interference δ tends to be uneven in the circumferential direction. Thus, when the outer race 1 rotates at high speed in this state, microscopic gaps tend to develop between the seal lip 12 and the seal surface 10 because the edge of the contact type seal lip 12 cannot precisely follow the axial movement of the seal surface 10. Through such microscopic gaps, rainwater and muddy water may enter the bearing.

On the other hand, in order to reduce the flatness to less than 5 μm, it is necessary to increase the chucking accuracy of a finishing machine and the rigidity of a cutting tool, which pushes up the manufacturing cost of the bearing. Thus, in the embodiment, the flatness A of the contact portion X of the seal surface 10 that is in contact with the contact type seal lip 12 is set in the range of 5 to 20 μm.

By setting the circumferential flatness A of the contact portion X of the seal surface 10 that is in contact with the contact type seal lip 12 to a value not more than 20 μm, the interference δ of the contact type seal lip 12 becomes substantially uniform in the circumferential direction of the seal surface 10, which reduces the axial movement of the seal surface 10 when the outer race 1 rotates at high speed, thereby allowing the edge of the contact type seal lip 12 to smoothly follow the axial movement of the seal surface 10. This improves the sealability of the sealed rolling bearing to such an extent that the entry of muddy water is substantially completely prevented.

Five rolling bearings were prepared of which three were Bearings 1 to 3 according to the invention in which the contact portions X of the seal surfaces 10 that are in contact with the contact type seal lips 12 had circumferential flatness values A of 6.8 μm, 16.8 μm and 20.0 μm, respectively. The other two were Comparative Bearings 1 and 2 in which the contact portions X of the seal surfaces 10 that are in contact with the contact type seal lips 12 had circumferential flatness values A of 25.5 μm and 30.0 μm, respectively. An evaluation test was conducted for these bearings. Table 1 shows the test results.

In this test, the bearings were rotated at 2000 rpm for three hours, while spraying Kanto Loam (JIS type 8) muddy water on the bearings. Then, the interior of the respective bearings was visually checked.

TABLE 1

| Sealability evaluation test | Flatness A | Test results |
| --- | --- | --- |
| Bearing 1 of the invention | 6.8 μm | ○ |
| Bearing 2 of the invention | 16.8 μm | ○ |
| Bearing 3 of the invention | 20.0 μm | Δ |
| Comparative Bearing 1 | 25.5 μm | X |
| Comparative Bearing 2 | 30.0 μm | X |

Evaluation:
○ No muddy water was observed inside
Δ Only water (water drops) was observed inside
X Muddy water was observed inside As will be apparent from these test results, no muddy water or water drops were observed in Bearings 1 and 2 according to the invention. While trace amounts of water drops were observed in Bearing 3 according to the invention, no muddy water was observed inside. It will thus be understood that by setting the circumferential flatness A of the contact portion X of the seal surface 10 that are in contact with the contact type seal lip 12 to a value not more than 20.0 μm, it is possible to improve the sealability of the sealed rolling bearing to such an extent that the entry of muddy water can be reliably prevented.

In the embodiment, a single-row sealed rolling bearing, i.e. a bearing with a single row of rolling elements 3 are shown. But the sealed contact rolling bearing according to the present invention is not limited to this particular type but may be a multiple-row sealed rolling bearings with a plurality of rows of rolling elements.

Figure 4:
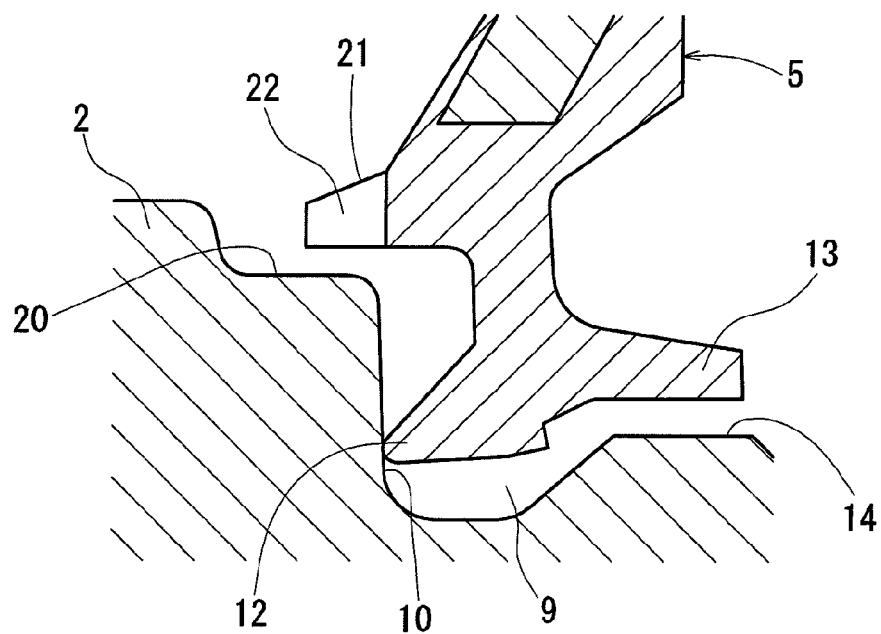
FIG. 4 is a sectional view of a different sealed rolling bearing embodying the present invention.
Figure 5:
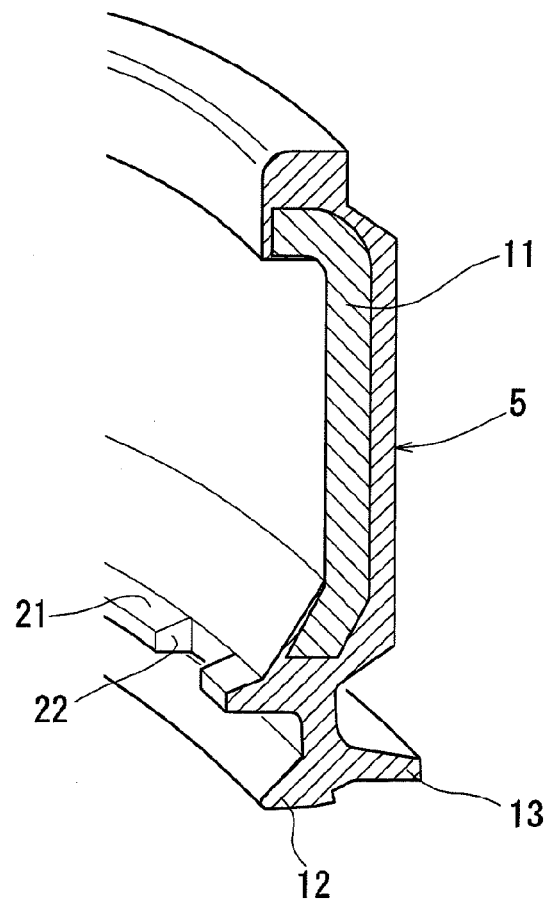
FIG. 5 is a partial perspective view of the seal lip shown in FIG. 4.

FIGS. 4 and 5 show another sealed rolling bearing embodying the present invention. This embodiment differs from the sealed rolling bearing shown in FIG. 2 in that a cylindrical surface 20 is formed on the radially outer surface of the inner race between the raceway 8 and the annular groove 9 of the inner race, and that the seal member 5 has on its inner surface a non-contact type seal lip 21 that opposes the cylindrical surface 20 to define a gap therebetween, the seal lip 21 being formed with a plurality of circumferentially equally spaced cutouts as oil passages 22 through which the interior of the bearing communicates with the contact type seal lip 12.

Thus, elements identical to those of the sealed rolling bearing shown in FIG. 2 are denoted by identical numerals and their description is omitted.

By providing the seal member 5 with the non-contact type seal lip 21 having the oil passages 22 on its inner surface, the non-contact type seal lip 21 serves to stop the grease sealed in the bearing and also support the internal pressure of the bearing when the bearing internal pressure rises due to a rise in the bearing internal temperature. The seal lip 21 thus prevents the contact type seal lip 12 from being pushed and spread by the grease or the bearing internal pressure, and also prevents leakage of grease.

Base oil leaching out of the grease is supplied through the oil passages 22 to the sliding contact portion of the contact type seal lip 12. Thus, a suitable amount of base oil can be uniformly supplied to the sliding contact portion of the contact type seal lip 12 over the entire circumference thereof. This reduces torque loss, and prevents uneven wear of the contact type seal lip 12.

The oil passages 22 are not limited to the cutouts but may be through holes formed in the non-contact type seal lip 21 to extend from its radially outer to inner surface.

What is claimed is:

1. A sealed rolling bearing comprising:
an outer race having a radially inner surface, an outer raceway formed on said radially inner surface, and first and second seal grooves disposed in said radially inner surface on first and second sides of said outer raceway, respectively;
an inner race having a radially outer surface and being mounted in said outer race, said inner race having an inner raceway disposed on said radially outer surface, first and second annular grooves being disposed in said radially outer surface on first and second sides of said inner raceway, respectively, said annular grooves each having an inner seal surface, and first and second portions of said radially outer surface being disposed between said inner raceway and said first and second annular grooves, respectively, and first and second small diameter cylindrical surface portions being disposed on said radially outer surface, said first and second small diameter cylindrical surface portions being disposed between said first and second portions of said radially outer surface and said first and second annular grooves, respectively and having diameters that are smaller than diameters of said first and second portions of said radially outer surface;

rolling elements mounted between said outer raceway and said inner raceway; and first and second seal members, each of said first and second seal members having an inner surface, a radially outer portion, a radially inner portion, and a non-contact seal lip disposed on said inner surface, said radially outer portion of each of said first and second seal member being fitted in said first and second seal grooves, respectively, and said radially inner portion of each of said first and second seal members being an inwardly extending contact type seal lip kept in elastic contact with said seal surface of said first and second annular groove, respectively, each of said inner surface of said first and second seal members defining a gap having an L-shaped section between said non-contact seal lip and said first and second small diameter cylindrical surface portions, respectively;

wherein each of said non-contact seal lips includes at least one oil passage through which an interior of said bearing is in communication with a siding contact portion of a contact seal lip, and wherein a seal surface of each of said first and second annular grooves has a circumferential flatness of 5 to 20 μm at a portion that is in contact with said first and second seal lips, respectively.

2. The sealed rolling bearing of claim 1 wherein said at least one oil passage includes a plurality of oil passages that are circumferentially spaced from each other.

3. The sealed rolling bearing of claim 2 wherein said plurality of oil passages comprises cutouts.

4. The sealed rolling bearing of claim 1, wherein said at least one oil passage comprises a cutout.

* * * * *